United States Patent
Baruch et al.

[19]

[11] Patent Number: 6,125,413
[45] Date of Patent: Sep. 26, 2000

[54] COMPUTER SYSTEM WITH TRIGGER CONTROLLED INTERFACE AND METHOD

[75] Inventors: Ezra Baruch, Karkur; Yaron Gold, Kadima; Dan M. Bruck, Beer-Yaacov, all of Israel

[73] Assignee: Motorola, Inc., Schaumburg, Ill.

[21] Appl. No.: 08/999,274

[22] Filed: Dec. 29, 1997

[51] Int. Cl.[7] .................................................. G06F 13/00
[52] U.S. Cl. ....................................................... 710/52
[58] Field of Search ................................ 710/52, 5, 6, 54

[56] References Cited

U.S. PATENT DOCUMENTS

| | | | |
|---|---|---|---|
| 4,816,996 | 3/1989 | Hill et al. ..................................... | 710/5 |
| 4,958,277 | 9/1990 | Hill et al. ..................................... | 710/52 |
| 5,379,379 | 1/1995 | Becker et al. ................................ | 711/3 |
| 5,805,922 | 9/1998 | Sim et al. ..................................... | 710/5 |

OTHER PUBLICATIONS

"Queued Serial Module (QSM) Reference Manual" by Motorola, Inc. 1991, order No. QSMRM/AD.

*Primary Examiner*—Glenn A. Auve

[57] ABSTRACT

An interface (101) in a computer system has an port (150) which is coupled to a memory via a first bidirectional data path (104) and coupled to a peripheral device via a communication path (106). The interface (101) has a controller (170) with a trigger buffer (175) and a pointer register (160). The pointer register (160) provides a movable pointer (165) to memory entries of data queues. The trigger buffer (175) continuously receives and accumulates trigger signals (①② ③)) and sends start signals ❶ ❷ ❸ to the pointer register (165). A queue is transmitted through the first path (104), the port (150) and the second path (106) or vice versa when a first trigger (e.g., (①)) signal arrives. The trigger buffer (175) receives further trigger signals (e.g., (②)) and accumulates them in a trigger buffer (175) before it sends start signals (e.g., ❷) for further transmissions. Optionally, interface 101 provides start signals after prioritizing trigger signals.

18 Claims, 9 Drawing Sheets

FIG. 9

COMPUTER SYSTEM WITH TRIGGER CONTROLLED INTERFACE AND METHOD

RELATED APPLICATION

The present application is related to the commonly assigned United States application "Computer system with interface and method" by Ezra Baruch et. al., having Ser. No. 08/999,178, filed 29 Dec. 1997.

FIELD OF THE INVENTION

The present invention generally relates to computer systems and, more particularly to interfaces for data communication used in such systems. The present invention also relates to a method for operating such systems.

BACKGROUND OF THE INVENTION

Computer systems (e.g., integrated microcomputers) comprise processors (e.g., a central processing unit CPU), memory units (e.g., a random access memory RAM), busses, and other components. Interfaces exchange data and control information between these components and peripheral devices (e.g., displays, printers, buzzers). For example, the processor writes data to the memory and the interface sends this data to the peripheral device, or vice versa. To save processor resources, it is convenient to control the interfaces partly or completely independent from the processor. For example, the interface can receive control signals (so-called "triggers") from, e.g., a timer.

When a first trigger arrives, the interface transfers a predetermined data set, a so-called "queue". However, a second trigger arriving while the interface is busy could lead to a trigger collision. To avoid collisions, consecutive triggers should arrive with a certain delay. Appropriate software in the timer can satisfy this requirement. But such an approach is cost intensive and can lead to errors.

The interface can store a trigger collision bit (TCB) for each queue Q(i) in a register. Such a TCB can be asserted by an incoming trigger signal T(i) and negated after the queue transfer is completed. The interface does not receive any new arriving trigger signals as long as TCB is asserted. But this approach is also not wanted, because some trigger signals might get lost without having invoked a queue transfer.

A queued serial peripheral interface unit (QSPI) is incorporated in many microcomputers and peripherals designed. The following references are useful: U.S. Pat. No. 4,816,996 (hereinafter "reference '996") and U.S. Pat. No. 4,958,277 (hereinafter "reference '277") both to Hill et al., and "Queued Serial Module (QSM) Reference Manual" by Motorola, Inc. 1991, order number QSMRM/AD.

The present invention seeks to provide a computer system with an improved interface which mitigates or avoids these and other disadvantages and limitations of the prior art.

DETAILED DESCRIPTION OF A PREFERRED EMBODIMENT

The terms "assert", "assertion", "negate" and "negation" are used to avoid confusion when dealing with binary signals. "Assert" and "assertion" are used to indicate that a binary signal is rendered active, or logically true (e.g., logical "1"). "Negate" and "negation" are used to indicate that a signal is rendered inactive, or logically false (e.g., logical "0"). In some instances, in order to accommodate standard usage, "set" or "setting" is used in the place of "assert" or "assertion" and "clear" or "clearing" is used in the place of "negate" or "negation".

The present invention is explained in connection with a QSPI, but this is not limiting. Those of skill in the art are able, based on the description herein, to apply the present invention to other interfaces without departing from the scope of the present invention. For convenience, a glossary of terms is provided prior to the claims.

Figure 1:
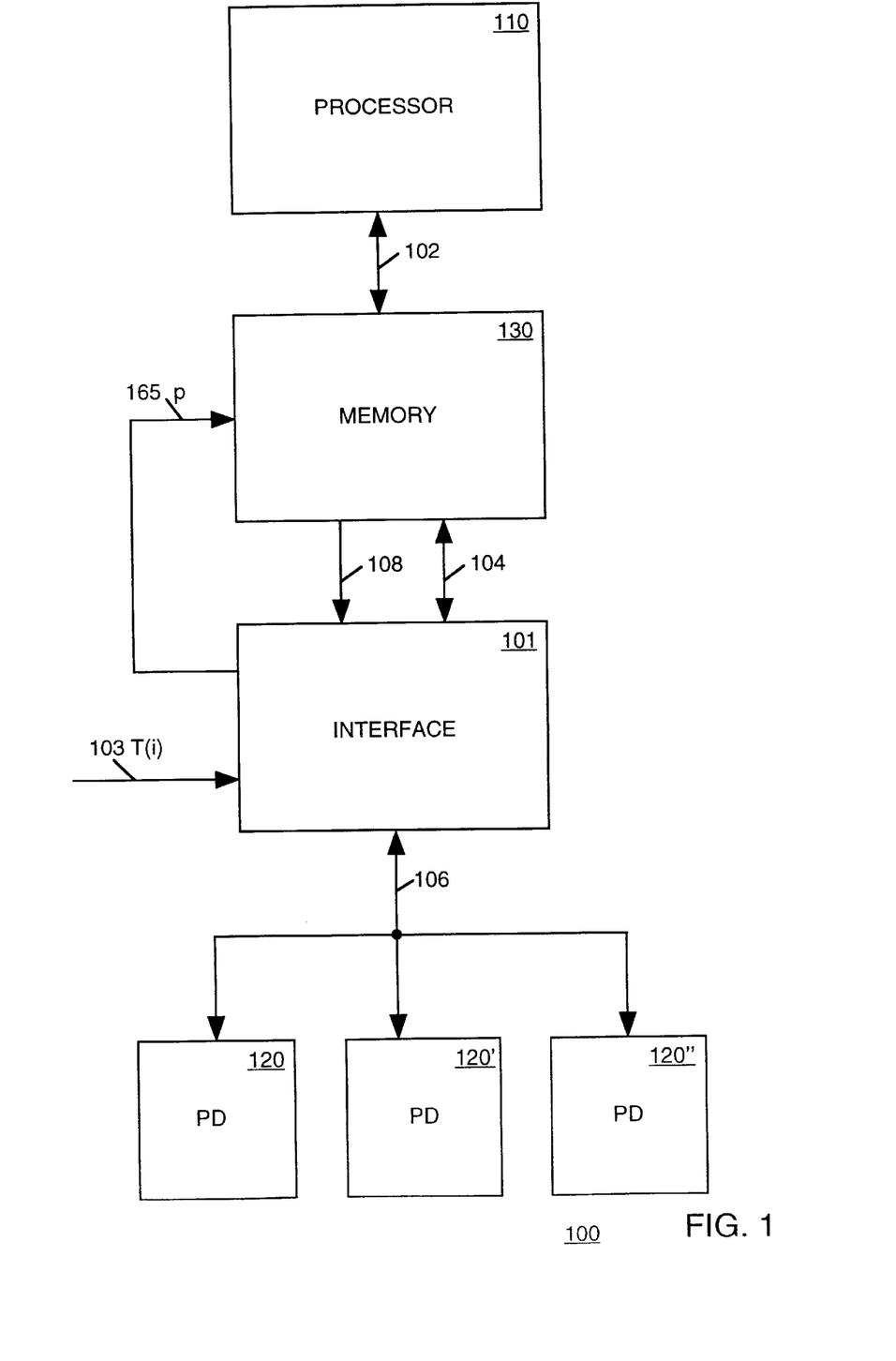
FIG. 1 is a simplified block diagram of a computer system according to the present invention.

FIG. 1 is a simplified block diagram of computer system 100 (hereinafter system 100) according to the present invention. System 100 comprises processor 110, memory 130, data interface 101 (hereinafter interface 101) and one or more peripheral devices (PD) 120, 120', 120", etc. (collectively peripheral devices 120). Processor 110 is coupled to memory 130 via bidirectional data path 102; memory 130 is coupled to interface 101 via bi-directional data path 104 and via control path 108; and interface 101 is coupled to peripheral devices 120, 120', 120" via path 106. Arrows at paths 102, 104, 108, and 106 illustrate a preferred signal flow. Pointer 165 ("pointer p") of interface 101 goes to memory 130. As indicated by line 103, interface 101 receives trigger signals T(i), hereinafter also "triggers". It is well known in the art how to provide trigger signals T(i) by, for example, processor 110, by a timer, or by a trigger generator. Interface 101 receives data from memory 130 and sends data to peripheral devices 120, 120', 120" or, vice versa, interface 101 receives data from peripheral devices 120 and writes data into memory 130. The terms "transmit", "transfer" and "exchange" are used herein as synonyms and are intended to include "receiving", "sending", and "writing".

According to the present invention, interface 101 buffers the trigger signals T(i) and, optionally prioritizes the data transfer. This is an important advantage of the present invention in comparison to the prior art. Prior art interfaces require an exact timing of arriving trigger signals. System 100 of the present invention receives trigger signals T(i) as they come and operates more efficiently.

FIGS. 1–3 and FIGS. 5–6, for purposes of clarity, do not include certain details which persons of skill in the art understand are required in an actual system. For example, some control paths by which a controlling device such as a CPU would control the operation of system 100 are not shown. These will be apparent from the further description below. In general, there are many possible ways to implement the logical functions of system 100 in hardware and the figures are only intended for purposes of illustration. Persons of skill in the art will understand how to implement system 100 based on the description herein.

Figure 2:
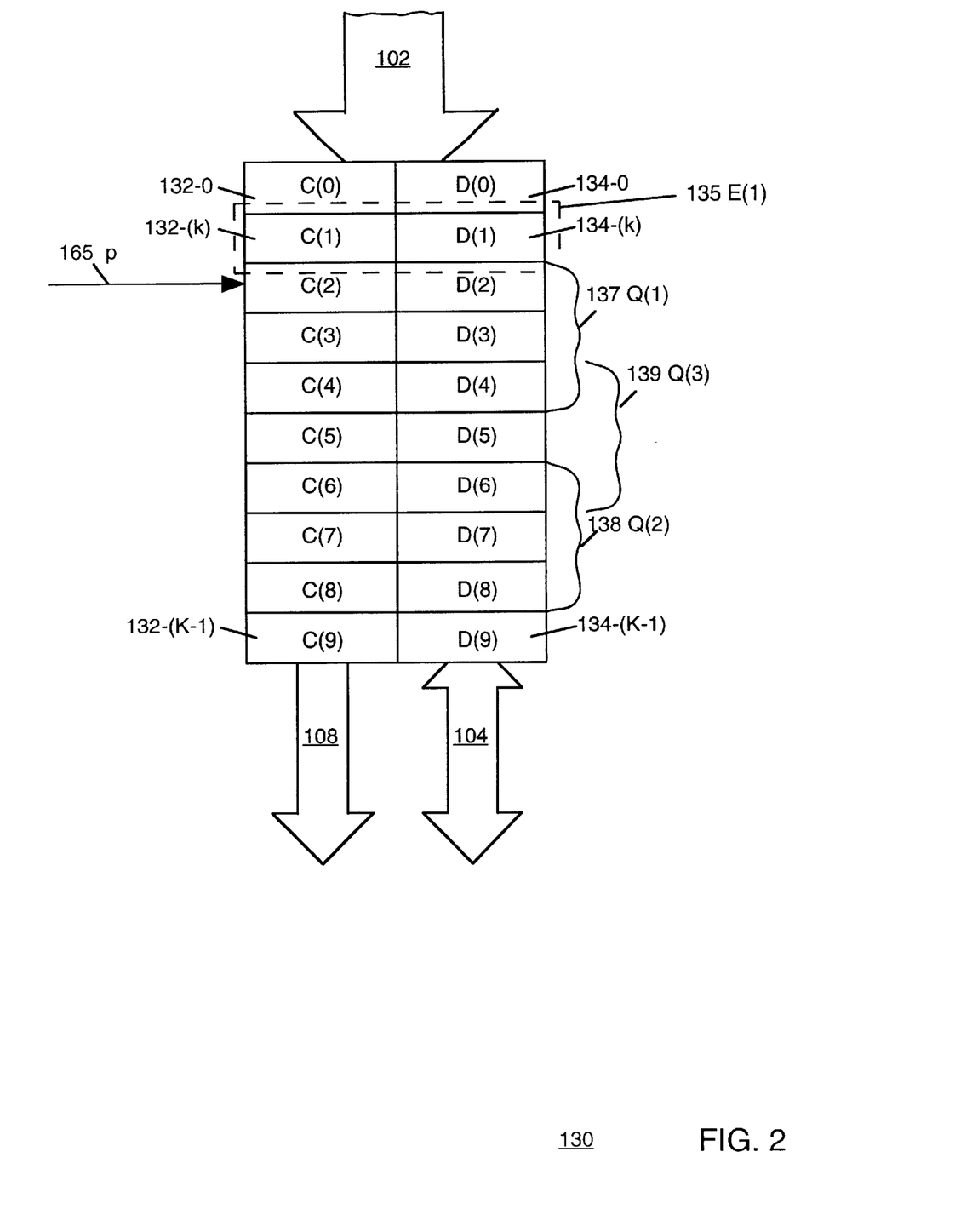
FIG. 2 is a simplified block diagram of a memory which is part of the system of FIG. 1.

FIG. 2 is a simplified block diagram of memory 130 which is part of system 100 (FIG. 1). Memory 130 has K control fields 132-k (k=0 to (K−1)) and K data fields 134-k (k=0 to (K−1)) (collectively "memory fields"). Pointer 165 (cf. FIG. 1, hereinafter pointer p) points to control fields 132-k and to data fields 134-k which have k=p. In the example of FIG. 2, pointer p=2 points to memory fields 132-2 and 134-2. For simplicity of explanation, indices k are considered as addresses for control fields 132-k and data fields 134-k. Control field 132-k stores control word C(k) and data field 134-k stores data word D(k). Control word C(k) and data word D(k) are collectively referred to as entry E(k). For example, entry E(1) is illustrated by dashed frame 135.

Consecutive entries E(k') to E(k") in memory 130 form a data queue (hereinafter queue Q(i) ). Preferably, single-primed index k' illustrates the start of a queue Q(i) and double-primed index k" illustrates the end of queue Q(i). Index i and j distinguish queues Q(i) and Q(j) with different entries. Queues can overlap and share entries, but this is not essential. In the example of FIG. 2, which is not intended to be limiting, memory 130 has each K=10 memory fields 132-k and 134-k and stores entries E(0) to E(9). Queue Q(l) (reference number 137) comprises entries E(2), E(3) and E(4) (k'=2, k"=4); queue Q(2) (reference number 138) comprises entries E(6), E(7) and E(8) (k'=6, k"=8) and queue Q(3) (reference number 139) comprises entries E(4), E(5), and E(6). Pluralities of queues Q(i) and Q(i') are given by a total number I (e.g., I=3) of queues. As an advantage of the present invention, system 100 can optionally accommodate queues Q(i) with different priorities. When trigger signals T(i) for a high priority queue and T(i') (with i≠i') for a low priority queue arrive substantially simultaneously, then the high priority queue Q(i) is served earlier than a low priority queue Q(i'). The priority is expressed by the index i. As for example, queue Q(1) has high priority, queue Q(2) has medium priority, and queue Q(3) has low priority, for i=1, 2, 3, respectively.

Preferably, bi-directional data path 102 carries control words C(k) and data words D(k) between processor 1 10 and memory 130 (cf. FIG. 1); bi-directional data path 104 carries data words D(k) between interface 101 and memory 130 (cf. FIG. 1); and control path 108 carries control words C(k) from memory 130 to interface 101.

Figure 3:
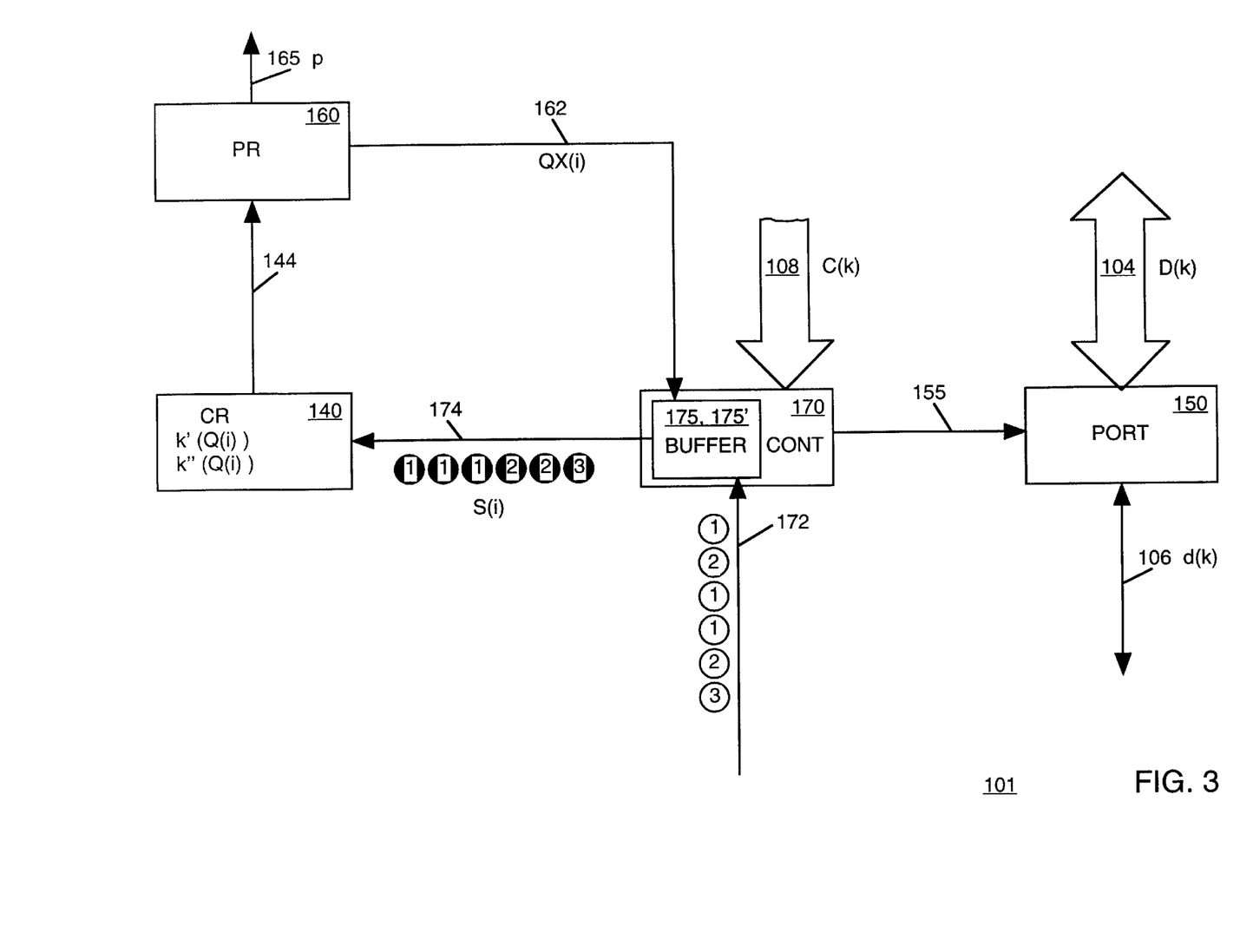
FIG. 3 is a simplified block diagram of an interface which is part of the system of FIG. 1.

FIG. 3 is a simplified block diagram of interface 101 which is part of system 100 (FIG. 1). Interface 101 comprises pointer register (PR) 160, control register (CR) 140, controller (CONT) 170, and port 150. Controller 170 comprises trigger buffer 175 (hereinafter buffer 175) explained in connection with FIG. 4. Alternatively, trigger buffer 175' (hereinafter buffer 175', FIG. 5) can also be used.

Port 150 exchanges data words D(k) with memory 130 via bi-directional path 104 and exchanges data words d(k) with peripheral device 120 (cf. FIG. 1) via bi-directional data communication path 106 (hereinafter path 106). The information of data words D(k) and d(k) remains substantially the same, while the form can change. For example, port 150 can be implemented as a data serializer. A data serializer is described in details in connection with FIGS. 3 of references '996 and '277. In such a case, data words D(k) would be parallel bits and data words d(k) would be serial bit sequences, but this is not important for the present invention. Port 150 receives control signals from controller 170 via line 155, but these signals are not essential for the present invention.

Conveniently, control register 140, stores start index k'(Q(i)) and end index k"(Q(i)) of each queue Q(i). Persons of skill in the art know, that queues can also be identified by other means. For example, a start index k' and the number of entries E(k) of Q(i) can also be used. Control register 140 is coupled to pointer register 160 via line 144 to communicate k'(Q(i)) and k"(Q(i))). Pointer register 160 generates pointer p (165) advancing between k' and k". Pointer p is a movable pointer which successively points to entries E(k') to E(k") of queue Q(i). It is well known in the art to generate such a pointer p. See, for example, references '996 and '277. The combination of control register 140 and pointer register 160 given here in FIG. 3 is therefore only an example.

According to the present invention, buffer 175 of controller 170 provides a start signal S(i) to control register 140 via line 174 and receives an end signal QX(i) from pointer register 160 via bus 162. S(i) is illustrated by symbols ❶ (e.g., S(1) for queue Q(1)) ❷ (e.g., S(2) for Q(2)), and ❸ (e.g., S(3) for Q(3)). After receiving S(i), pointer register 160 moves pointer p and port 150 transfers data words D(k) of queue Q(i) between memory 130 and peripheral device 120. Then, pointer register 160 tells buffer 175 through QX(i) on bus 162 that queue Q(i) has finished. Preferably, pointer register 160 will not accept a new S(i) while a queue is being transmitted.

Optionally, controller 170 receives control words C(k) from memory 130 via path 108. Control words C(k) are used to define parameters for path 106 and for other purposes. Buffer 175 receives trigger signals T(i) at line 172. Line 172 can be a bus with e.g., a number of I partial lines for each queue Q(i), or trigger signals T(i) can be provided via a single line. In the following text and FIGS., trigger signals T(i) are illustrated by symbols ① (trigger signal T(1) for Q(1)), ② (trigger signal T(2) for Q(2)), ③ (trigger signal T(3) for Q(3)), etc. Trigger signals T(i) can be considered as tokens. In the example of FIG. 3, trigger signals T(i) arrive in the order ① ② ① ① ② ③. Preferably, buffer 175 of controller 170 comprises a priority mechanism so that buffer 175 provides start signals S(i) in a prioritized order (e.g., ❶ ❶ ❶ ❷ ❷ ❸)

Trigger signals T(i) (e.g. ①), start signals S(i) (e.g., ❶) and end signals QX(i) are preferably, binary signals which are asserted only for a short time to invoke actions and which reset automatically.

Figure 4:
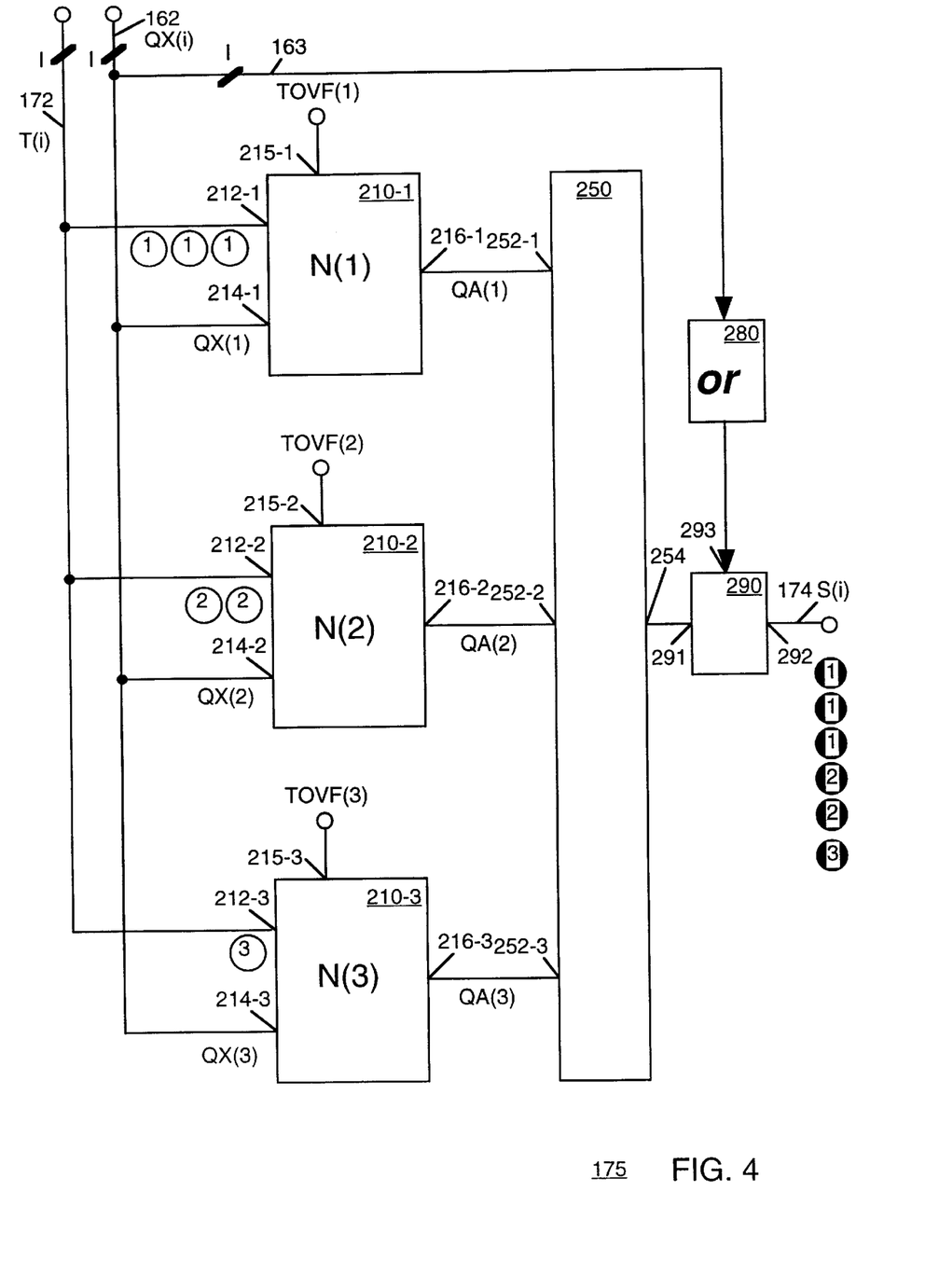
FIG. 4 is a simplified block diagram of a first trigger buffer of the interface of FIG. 3 according to the present invention.

FIG. 4 is a simplified block diagram of trigger buffer 175 of interface 101 (FIG. 3) according to the present invention. For convenience, buffer 175 is illustrated for an example with i=1 to i=I=3. Buffer 175 comprises trigger accumulators 210-i (e.g., 210-1, 210-2, and 210-3, hereinafter accumulators), optional priority logic 250, or-gate 280 and transfer gate 290. In buffer 175, trigger input line 172 (cf. FIG. 3) is coupled to selective inputs 212-i of accumulators 210-i. Bus 162 (cf. FIG. 3) is coupled to selective inputs 214-i of accumulators 210-i. The term "selective input" is convenient for explanation. For example, accumulator 210-1 receives ① and QX(1), but does not receive ②, ③, QX(2) or QX(3). A person of skill in the art is able to implement lines 172 and bus 162 and selective inputs 212-i and 214-i by separate wiring for each queue. But this is not essential. Accumulators 210-i have outputs 216-i for providing intermediate signals ("ready signals") QA(i). Optional priority logic 250 has inputs 252-i for receiving QA(i) and line 174 for providing start signal S(i).

Preferably, accumulator 210-i increments an internal variable N(i), or "counter variable", every time a trigger signal T(i) arrives at input 212-i. Accumulator 210-i decrements N(i) every time an end signal QX(i) arrives at input 214-i. The terms "increment" and "decrement" are widely used in the computing art to express that the numerical value of an integer variable changes by addition or subtraction, respectively, of a numerical value of "1". In this application, these terms are used in a broader sense and to express that a magnitude of a variable, such as e.g., N(i), is changed (counted) in a first direction or in a second, opposite direction. Accumulator 210-i provides binary ready signal QA(i). When trigger signals T(i) have been accumulated, then accumulator 210-i asserts QA(i), otherwise accumulator 210-i negates QA(i):

$$QA(i)="1" \text{ for } N(i)>0 \qquad (1)$$

$$QA(i)="0" \text{ for } N(i)=0. \qquad (2)$$

Priority logic 250 passes intermediate signal QA(i)="1" to S(i) for queues with the highest priority, and does not pass QA(i)="1" for queues with a lower priority.

Priority logic 250 has output 254 coupled to input 291 of transfer gate 290. Transfer gate 290 has output 292 at line 174. Transfer gate 290 is enabled at input 293 by or-gate 280. Or-gate 280 receives QX(i) for all i=1 to I from bus 162 or bus 163. Or-gate 280 monitors end signals QX(i) and transfer gate 290 transfer start signals S(i) only when an old queue has been transmitted completely. Conveniently, transfer gate 280 blocks start signals S(i) during queue transmission.

Optionally, accumulator 210-i has output 215-i for providing a trigger overflow signal TOVF(i) when N(i) has reached a maximum value $N_{max}$. Signals TOVR(i) can be communicated, for example, to processor 110 to create an interrupt. This feature also distinguishes the present invention from the prior art. In the prior art, the above mentioned TCB signal is asserted when a single trigger has arrived. According to the present invention, accumulator 210-i asserts TOVF(i) after having received a predetermined number $N_{max}$ of trigger signals T(i). $N_{max}$ expresses the capacity of buffer 175 to accommodate trigger signals. It is included in the present invention, that $N_{max}$ can be programmed and modified during operation of interface 101. $N_{max}$ can be different for each accumulator 210-i (e.g., $N_{max}(1) \neq N_{max}(2)$). For simplicity, FIG. 4 does not show signal lines which could fetch $N_{max}$, for example, from processor 110. With this feature, system 100 contributes to the flexibility of system 100.

Figure 5:
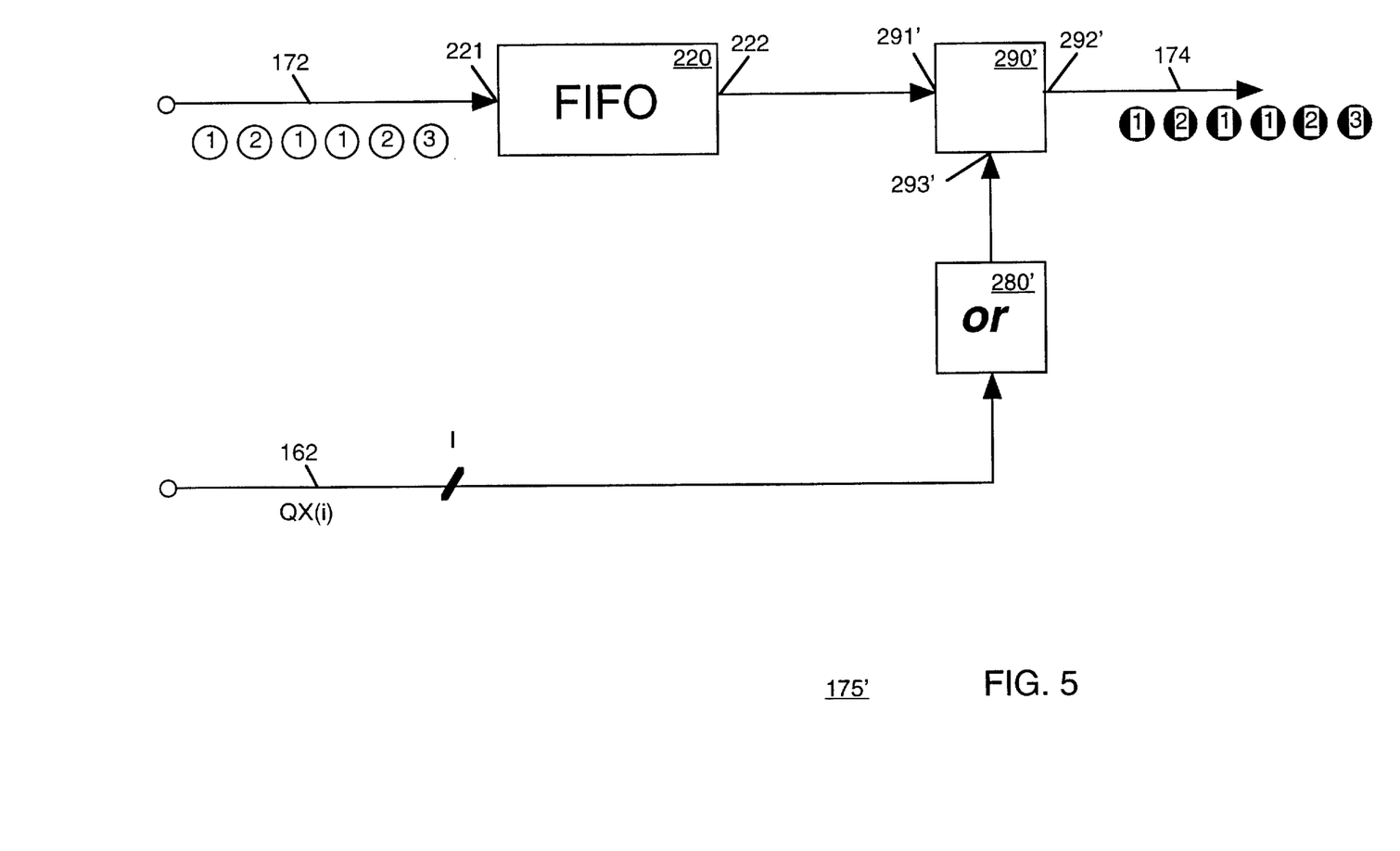
FIG. 5 is a simplified block diagram of a second trigger buffer which can be used instead of the first trigger buffer of FIG. 4.

FIG. 5 is a simplified block diagram of buffer 175' which can be used instead of buffer 175 (FIG. 4). Reference numbers 162, 172, 174, 175 1 175', 280/280', 290/290', 291/291', 292/292', and 293/293' in FIGS. 4–5 refer to analogous elements, whose function can be, however, different. Buffer 175' comprises accumulator 220, transfer gate 290', and or-gate 280'. Accumulator 220 is, preferably, a first-in-first-out register (FIFO). Accumulator 220 has input 221 at line 172 and output 222 coupled to input 291' of transfer gate 290'. Transfer gate 290' has output 292' at line 174. Transfer gate 290' is enabled at input 293' by or-gate 280'. Or-gate 280' receives QX(i) for all i=I to I from bus 162. Transfer gate 280' monitors end signals QX(i) and transfer gate 290' transfers a single trigger signal T(i) to a single start signal S(i) when a queue has been transmitted completely.

In this implementation, queues are not prioritized. The input sequence of trigger signals T(i) (e.g., ①②①①② ③) is equal to the output sequence of start signals S(i) (e.g., ❶ ❷ ❶ ❶ ❷ ❸). The capacity to buffer 175' to accommodate trigger signals is expressed by the size of accumulator 220.

Figure 6:
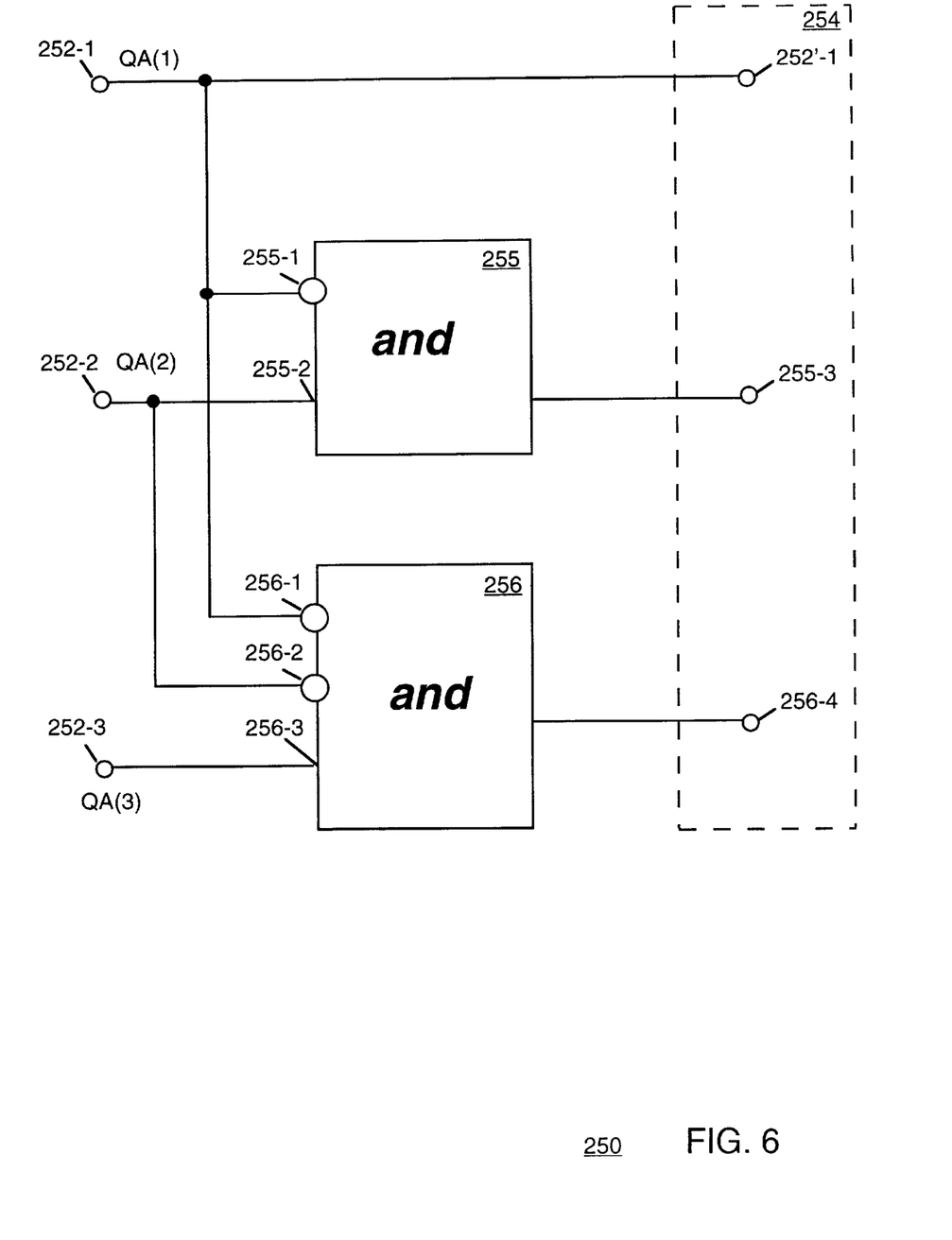
FIG. 6 is a simplified block diagram of a priority logic which is part of the trigger buffer of FIG. 4.

FIG. 6 is a simplified block diagram of priority logic 250 which is part of trigger buffer 175 (FIG. 4). Priority circuits are well known in the art. Priority logic 250 of FIG. 6 is intended to be an example for I=3, which is not limiting. Persons of skill in the art are able to implement priority logic 250 in a different way. For the above mentioned example with I=3, the start signals S(i) for queues with high (e.g., Q(1)), medium (e.g., Q(2)), and low (e.g., Q(3)) priorities are derived from signals QA(i) according to:

$$S(1)=QA(1) \text{ (high)} \qquad (3)$$

$$S(2)=QA(2) \text{ and } \underline{QA(1)} \text{ (medium)} \qquad (4)$$

$$S(3)=QA(3) \text{ and } \underline{QA(2)} \text{ and } \underline{QA(1)} \text{ (low)} \qquad (5)$$

wherein "and" indicates logical conjunctive operation, and the underscoring of terms indicates logical inversion.

To implement such relations, priority logic 250 comprises, for example, and-gates 255 and 256. Priority logic 250 has inputs 252-1, 252-2 and 252-3, corresponding to 252-i of FIG. 4, and output 254 (FIG. 4) illustrated by a dashed frame around outputs 252-1', 255-3 and 256-4. And-gate 255 has inverting input 255-1 (circle symbol) and non-inverting input 255-2 and output 255-3. And-gate 256 has inverting inputs 256-1, 256-2 and non-inverting input 256-3 and output 256-4. Input 252-1 is coupled to output 252-1', to input 255-1 of and-gate 255, and to input 256-1 of and-gate 256. Input 252-2 is coupled to input 255-2 of and-gate 255 and to input 256-2 of and-gate 256. Input 252-3 is coupled to input 256-3 of and-gate 256. Priority logic 250 channels trigger signals T(i) according to priorities of queue transfers.

Figure 7:
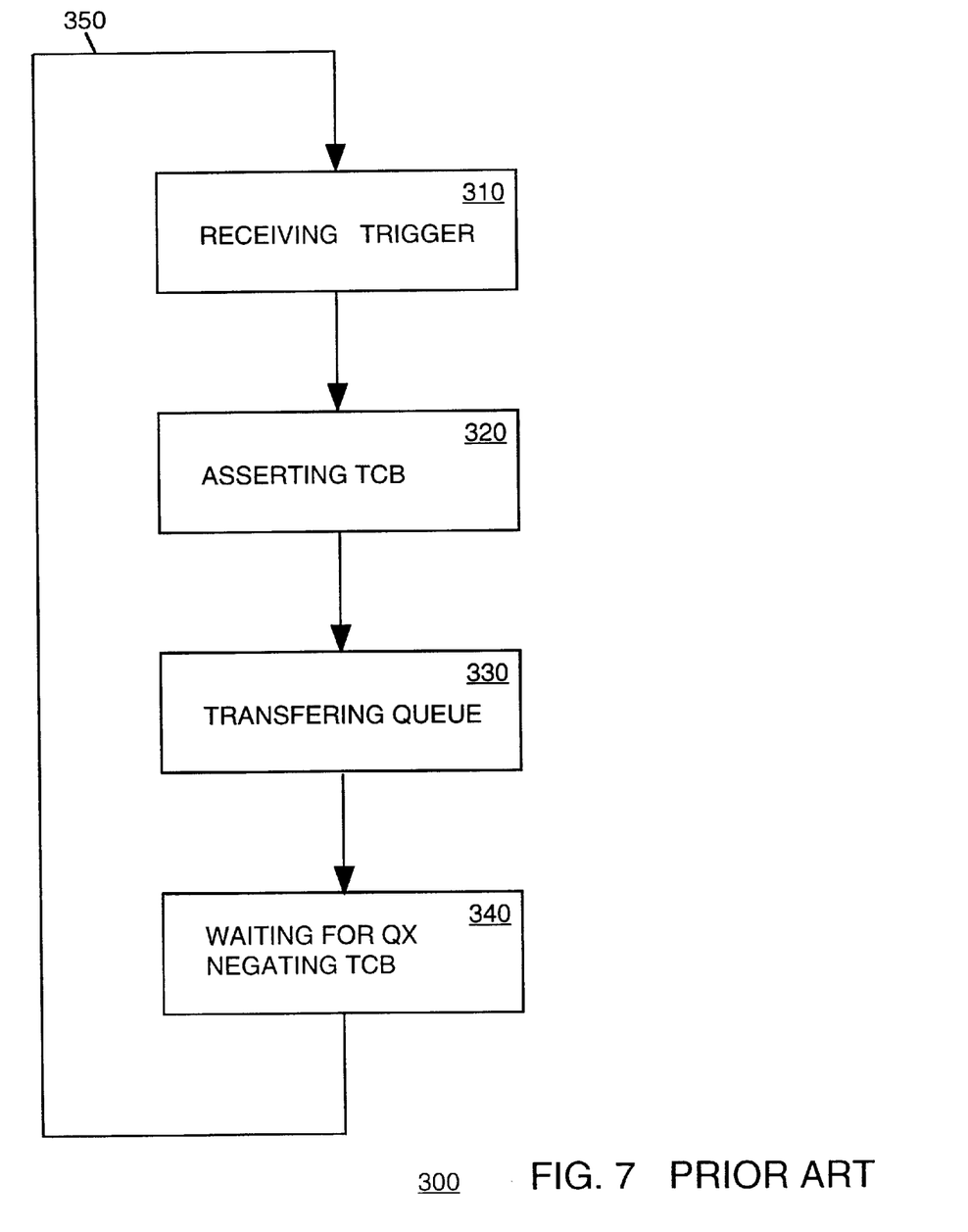
FIG. 7 is a simplified flow chart diagram of a prior art method.

FIG. 7 is a simplified flow chart diagram of prior art method 300. (See, for example, references '996 and '277.) Method 300 comprises receiving trigger step 310, asserting TCB step 320, transferring queue step 330, and waiting for QX and negating TCB step 340. Preferably, steps 310-340 are performed consecutively in repetitions (line 350 from step 340 to step 310). The interface can assert the TCB when a trigger signal T(i) comes (steps 310 and 320) and negate the TCB after the queue transfer is completed (steps 330 and 340). The interface does not receive any new arriving trigger signals as long as TCB is asserted. This is the main disadvantage of the prior art.

Figure 8:
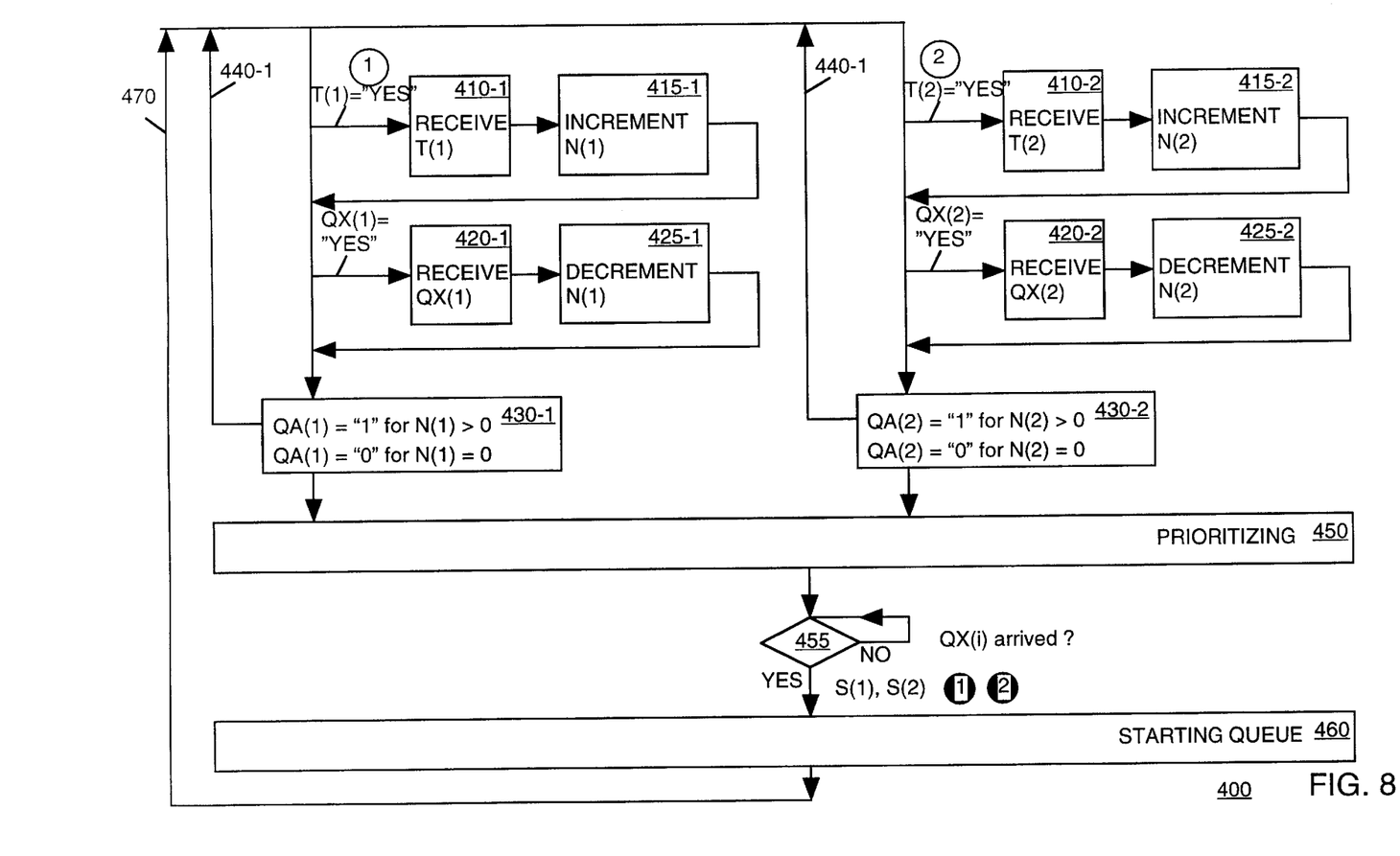
FIG. 8 is a simplified flow chart diagram of a method according to the present invention.

FIG. 8 is a simplified flow chart diagram of method 400 according to the present invention. Method 400 is, preferably, applied to system 100 of the present invention, but can also be used in other systems. In FIG. 8, method steps are shown by blocks and a preferred method flow is illustrated by lines with arrows. Method 400 comprises step 410-i for receiving trigger signal T(i), step 415-i for incrementing N(i), step 420-i for receiving end signal QX(i), step 425-i for decrementing N(i), step 430-i for providing ready signal QA(i), step 450 for optional prioritizing, and step 460 for starting queue Q(i). Steps 410-i, 415-i, 420-i, 425-i, and 430-i (collectively "i-steps") are performed in accumulators 210-i at substantially any time. For simplicity, FIG. 8 illustrates the i-steps for i=1 to I=2. Preferably, every accumulator 210-i performs the i-steps consecutively, but independently from the other accumulators 210-i. For example, accumulator 210-1 can receive trigger signal T(1) (step 410-1) while accumulator 210-2 provides ready signal QA(2) (step 430-2). Receiving trigger signal step 410-i and incrementing N(i) step 415-i are only performed when a trigger signal T(i) has arrived ("T(i)="YES"); and receiving end signal QX(i) step 420-i and decrementing N(i) step 425-i are only performed when QX(i) has arrived (QX(i)= "YES").

Accumulator 210-i repeats the i-steps (repetition line 440-i). Priority logic 250 performs prioritizing step 450, preferably, simultaneously with the i-steps. During prioritizing step 450, priority logic 250 asserts start signals S(i), for example, as explained in Eqs. (3) to (5). When previous queue transfers are completed (e.g., all QX(i)="1"), or-gate 280 enables transfer gate 290 to forward start signal S(i). The operation of or-gate 280 and transfer gate 290 is illustrated by query step 455. Then, control register 140 and pointer register 160 perform starting queue Q(i) step 460. Repetition line 470 illustrates a return of system 100 to the i-steps after starting queue Q(i) step 460. Query step 455 has a similar function as step 340 (prior art).

To illustrate the advantages of the present invention, it is useful to compare the trigger receiving steps (310, 41 0-i) and the waiting steps (340, 455) in prior art method 300 (See FIG. 7) and method 400 of the present invention (See FIG. 8). According to method 400 of the present invention, receiving trigger signal T(i) step 410-i and query step 455 (waiting) are independent steps which can be performed simultaneously. In prior art method 300, receiving trigger step 310 and step 340 are performed consecutively, but not simultaneously.

Figure 9:
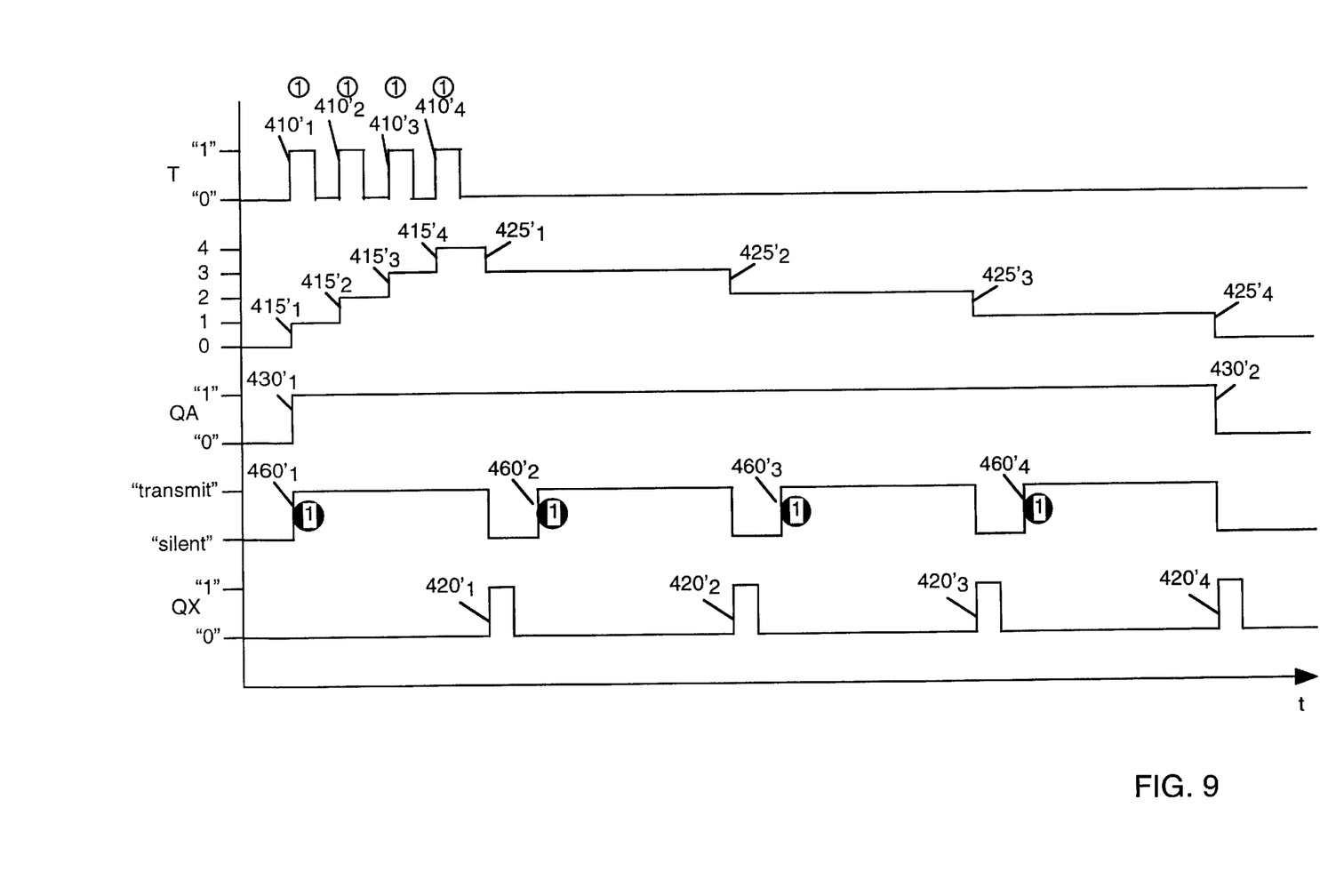
FIG. 9 is a simplified timing diagram illustrating the method of FIG. 8 by an example.

FIG. 9 is a simplified timing diagram illustrating method 400 (FIG. 8) by an example. For simplicity, it is assumed that only one queue Q(i) (i=I=1) is served. Prioritizing step 450 is therefore left out, and S(i) is assumed to be S(i)=QA (i)=S(1) (● symbol). 4 consecutive trigger signals T(i) (①①①①) arrive at time intervals which are shorter than an execution time of queue Q(i). In the prior art, this would lead to a trigger collision. According to method 400, the trigger signals T(i) are accommodated without collision. In the following T(i) is abbreviated as "T", N(i) as "N", QA(i) as "QA", and QX(i) as "QX". Signals T ("0" or "1"), QA ("0" or "1"), and QX ("0" or "1") and variable N (e.g., N=0 to N=4) are given in a vertical axis. The words "transmit" and "silent" illustrate that the transmission by port 150 of a queue is in progress or not in progress. The time t is given on a horizontal axis. For convenience, signal traces have primed reference numbers which correspond to the steps of method 400. The "-i" extension of the reference numbers used on FIG. 8 is left out for simplicity. Subscript indices on the traces indices illustrate the repetition of steps.

In the example of FIG. 9, steps are performed, preferably, in the following order:

- receiving a first trigger signal T in step 410 (trace 410'$_1$)
- incrementing N from initially N = 0 to N = 1 in step 415 (trace 415'$_1$)
- asserting QA = "1" in step 430 (trace 430'$_1$)
- starting queue Q(1) in step 460 ("transmit") (trace 460'$_1$)
- receiving a second trigger signal T in step 410 (trace 410'$_2$)
- incrementing N to N = 2 in step 415 (trace 415'$_2$)
- receiving a third trigger signal T in step 410 (trace 410'$_3$)
- incrementing N to N = 3 in step 415 (trace 415'$_3$)
- receiving a fourth trigger signal T in step 410 (trace 410'$_4$)
- incrementing N to N = 4 in step 415 (trace 415'$_4$)
- receiving assreted QX in step 420 (trace 420'$_1$)
(Pointer p has reached k" so that queue Q(1)

-continued becomes "silent")
- decrementing N to N = 3 in step 425 (trace 425'$_1$)
- starting queue Q(1) again in step 460 ("transmit") (trace 460'$_2$)
- receiving asserted QX (queue "silent" again) in step 420 (trace 420'$_2$)
- decrementing N to N = 2 in step 425 (trace 425'$_2$)
- starting queue Q(1) again in step 460 ("transmit") (trace 460'$_3$)
- receiving asserted QX (queue "silent" again) in step 420 (trace 420'$_3$)
- decrementing N to N = 1 in step 425 (trace 425'$_3$)
- starting queue Q(1) again in step 460 ("transmit") (trace 460'$_4$)
- receiving asserted QX (queue "silent" again) in step 420 (trace 420'$_4$)
- decrementing N to N = 0 in step 425 (trace 425'$_4$)
- negating QA = "0" in step 430 (trace 430'$_2$)
Now, Q(1) has been transmitted 4 times.

In other words, method 400 is a method for transmitting queues from a memory (e.g., memory 130) to a communication path (e.g., path 106) or vice versa (bi-directional) with the steps of: (a) receiving a first trigger (e.g., ①) of a first queue (e.g., queue Q(1)) and starting the first queue (by e.g., ●); (b) receiving and storing a second trigger (e.g., ② or again ①) for a second queue (e.g., queue Q(2) or again Q(1)); (c) starting the second queue when the first queue is finished (e.g., when p=k" and QX(1) is asserted); and (d) repeating steps (a) to (c) for further queues.

The second queue (step (c)) can cover the same data words D(k') to D(k") as the first queue. First and second trigger can be selectively stored or counted at different locations. For example, trigger ① goes to accumulator 210-1 and trigger ② goes accumulator 210-2. In such cases, the first and the second queue conveniently cover different data (e.g., Q(1) with E(2) to E(4) and Q(2) with E(6) to E(8)). An optional prioritizing step (e.g., step 450) is preferably performed after steps (a) and (b) for queues having different priorities (e.g., Q(1) high and Q(2) medium).

During repeating step (d) above, the triggers are counted by an auxiliary variable (e.g., N(i)) in a first direction (e.g., incrementing N(i) step 415-i). Or, the auxiliary variable is counted in a second, opposite direction (e.g., decrementing N(i) step 425-i) every time a queue is finished.

The descriptions of interface 101 in connection with FIGS. 3–6 and its operation in connection with FIGS. 8–9 are intended as non-limiting examples. Persons of skill in the art are able to modify interface 101 without departing from the scope of the invention. For example, interface 101 can be implemented by an all-purpose processor and the steps of method 400 can be program instructions. Interface 101 can be programmable.

While the invention has been described in terms of particular structures, devices and methods, those of skill in the art will understand based on the description herein that it is not limited merely to such examples and that the full scope of the invention is properly determined by the claims that follow.

Glossary of Terms
In the following, abbreviations, and writing conventions are listed alphabetically.
This glossary is provided only for convenience.

| | |
|---|---|
| C(k) | control word stored in control field |
| CPU | central processing unit |
| D(k) | data word stored in data field |
| E(k) | entry as a collective term for C(k) and D(k) |
| FIFO | "first-in-first-out" |
| i, j | index for queues |
| I | total number of queues |

-continued

Glossary of Terms
In the following, abbreviations, and writing conventions are listed alphabetically.
This glossary is provided only for convenience.

| | |
|---|---|
| k | index for memory field |
| k' | start index (start address) of queue |
| k" | end index (end address) of queue |
| K | number of memory fields |
| N(i) | counter index for trigger signals T(i) |
| $N_{max}$ | maximum value of N(i) |
| p | pointer |
| QSPI | queued serial peripheral interface unit |
| Q(i) | queue |
| QA(i) | binary signal from accumulator ("ready signal") |
| QX(i) | binary signal from pointer register ("end signal") |
| RAM | random access memory |
| S(i) | start signal |
| t | time |
| T(i) | trigger signal for queue Q(i) |
| TCB | trigger collision bit |
| TOVF(i) | trigger overflow signal |

What is claimed is:

1. A computer system with a trigger controlled interface between a memory and a communication path, said interface comprising:
   a pointer register having a movable pointer to queues of said memory,
   a controller continuously receiving trigger signals and sending start signals to said pointer register so that a first queue is transmitted between said memory and said communication path in either direction when a first trigger signal arrives, said controller receiving further trigger signals while said first queue is being transmitted, buffering said further trigger signals, and consecutively sending start signals for further transmissions when the transmission of said first queue is finished.

2. The computer system of claim 1 wherein said communication path is coupled to said memory via a first bi-directional data path, a port and second bi-directional data path.

3. The computer system of claim 2 wherein said first bi-directional data path carries data in parallel and said second bi-directional path carries data serially.

4. The computer system of claim 1 wherein said controller comprises:
   trigger accumulators for each queue selectively receiving triggers and providing ready signals for each queue; and
   a priority logic receiving said ready signals and providing start signals for each queue.

5. The computer system of claim 1 wherein said controller comprises a first-in-first-out register.

6. The computer system of claim 1 wherein said controller comprises a transfer gate for blocking said start signals during said transmission of said first queue.

7. A system having an interface for transferring data queues from a memory to a communication path or vice versa, said system being characterized in that said interface comprises a trigger buffer for receiving first and second triggers and starting queue transfers, said trigger buffer counting incoming first and second triggers in a first direction and counting the completion of a queue transfer in a second, opposite direction.

8. The system of claim 7 wherein said trigger buffer receives first and second triggers at time intervals which are shorter than the execution time for said queue transfer, and wherein said trigger buffer starts a second queue transfers after completion of a first queue transfer.

9. The system of claim 7 wherein said trigger buffer comprises a plurality of accumulators for selectively counting triggers for data queues having different priority.

10. The system of claim 7 wherein said interface further comprises a priority logic for channeling said first and second triggers according to priorities of first and second queue transfers.

11. The system of claim 7 wherein said interface is implemented by an all-purpose processor.

12. The system of claim 7 wherein said interface is programmable.

13. The system of claim 7 wherein said trigger buffer has a programmable capacity to store triggers.

14. A method for transmitting queues from a memory to a communication path or vice versa, said method comprising the steps of:
   (a) receiving a first trigger of a first queue and initiating the transmission of said first queue;
   (b) receiving a second trigger for a second queue and storing said second trigger in a buffer;
   (c) when said first queue is finished, releasing said second trigger from said buffer and initiating the transmission of said second queue; and
   (d) repeating said steps (a) to (c) for further queues.

15. The method of claim 14 wherein in said step (c) said second queue covers the same data as said first queue.

16. The method of claim 14 wherein in said steps (a) and (b) said first and second triggers are selectively stored at different locations when said first and second queue cover different data.

17. The method of claim 14 wherein during (d) repeating, said first and second triggers are counted by an auxiliary variable in a first direction, said auxiliary variable being counted in a second, opposite direction every time a queue is finished.

18. A method for transferring queues, said method comprising the steps of:
   (i) simultaneously for a plurality of I queues Q(i) (i=1 to I):
      receiving incoming trigger signals T(i) and incrementing variables N(i);
      receiving queue end signals QX(i) and decrementing said variables N(i);
   (ii) providing intermediate signals $QA(i)="1"$ for $N(i)>0$ or $QA(i)="0"$ for $N(i)=0$;

(iii) prioritizing said intermediate signals $QA(i)="1"$ to start signals S(i); and
   (iv) initiating data transfer of a queue under the condition that $S(i)="1"$ and repeating said steps (i) to (iii) while said queue is being transferred.

* * * * *